(12) United States Patent
Kuntze et al.

(10) Patent No.: US 7,837,257 B2
(45) Date of Patent: Nov. 23, 2010

(54) CLIP ASSEMBLY—ROOF DITCH MOLDING

(75) Inventors: Christopher J. Kuntze, Clarkston, MI (US); Michelle Vanbuskirk, Rochester Hills, MI (US)

(73) Assignee: Magna International Inc., Aurora (CA)

( * ) Notice: Subject to any disclaimer, the term of this patent is extended or adjusted under 35 U.S.C. 154(b) by 275 days.

(21) Appl. No.: 12/105,531

(22) Filed: Apr. 18, 2008

(65) Prior Publication Data

US 2009/0031539 A1    Feb. 5, 2009

Related U.S. Application Data

(60) Provisional application No. 60/962,574, filed on Jul. 30, 2007.

(51) Int. Cl.
*B60J 7/00* (2006.01)
(52) U.S. Cl. ...................... 296/210; 296/213
(58) Field of Classification Search .......... 296/210, 296/213; 24/289, 297
See application file for complete search history.

(56) References Cited

U.S. PATENT DOCUMENTS 5,413,398 A * 5/1995 Kim .......................... 296/210
6,557,931 B1 * 5/2003 Tremmel et al. ............ 296/213

FOREIGN PATENT DOCUMENTS

JP          402109755       * 4/1990

* cited by examiner

*Primary Examiner*—Joseph D Pape
(74) *Attorney, Agent, or Firm*—Warn Partners P.C.

(57) ABSTRACT

The present invention is a clip assembly for positioning a trim strip in a first direction and a second direction having a body portion, at least one centering wing connected to the body portion, and at least one flange connected to the body portion, with the flange connectable to a trim strip. The present invention also includes a fastener connectable to a vehicle such that when the fastener is connected to the vehicle, the centering wing locates the clip assembly and the trim strip in the first direction, and the flange connects the clip assembly to the trim strip.

25 Claims, 7 Drawing Sheets

CLIP ASSEMBLY—ROOF DITCH MOLDING

CROSS-REFERENCE TO RELATED APPLICATIONS

This application claims the benefit of U.S. Provisional Application No. 60/962,574, filed Jul. 30, 2007.

FIELD OF THE INVENTION

The present invention relates to a clip assembly used in a roof ditch molding assembly.

BACKGROUND OF THE INVENTION

Current vehicle architecture includes a right-hand and left-hand roof ditch that is usually where the body side assembly structure and the roof assembly structure come together for joining through a suitable type of connection such as spot-welding. The roof ditch does not create a good visual exterior "Class-A" surface, therefore the roof ditch is usually covered with a roof ditch molding insert that must provide an appearance that is acceptable to the customer.

Fluctuations in the dimension and location of parts during manufacturing are common, which is why most manufacturing operations incorporate the use of undesirable and unsightly tolerances. These variations make it difficult to create a molding that can be properly centered along the roof ditch to provide a desirable "class A" surface. Therefore, it is desirable to provide a roof ditch molding and clip which solves the aforementioned problems.

SUMMARY OF THE INVENTION

The present invention is a clip assembly for positioning a trim strip in a first direction and a second direction having a body portion, at least one centering wing connected to the body portion, and at least one flange connected to the body portion, with the flange connectable to a trim strip.

The present invention also includes a fastener connectable to a vehicle such that when the fastener is connected to the vehicle, the centering wing locates the clip assembly and the trim strip in the first direction, and the flange connects the clip assembly to the trim strip.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
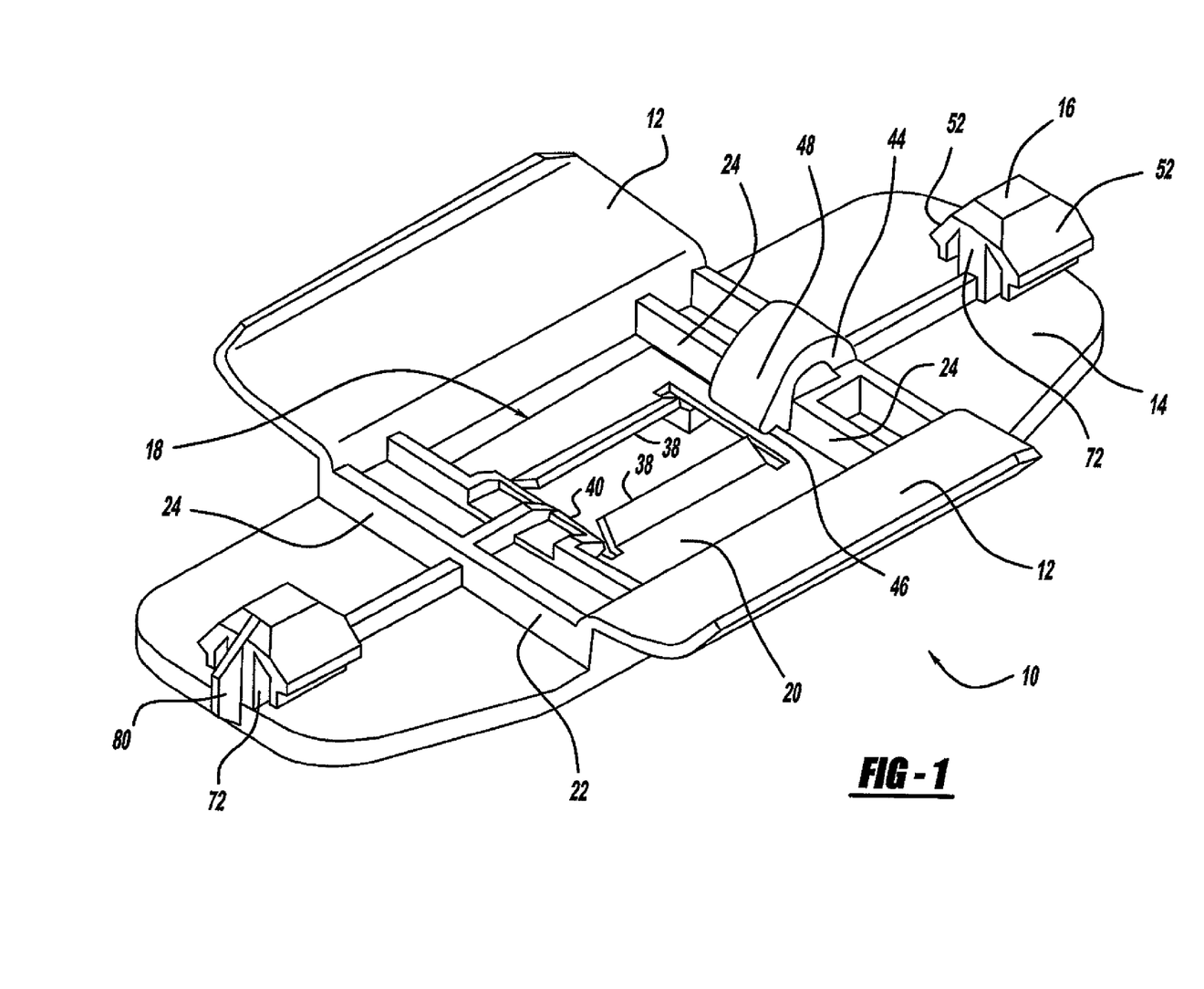
FIG. 1 is a perspective view of a clip assembly having a first type of insert, according to the present invention.

Referring to the Figures generally, a clip assembly for a roof ditch lining according to the present invention is shown at 10. The clip assembly 10 includes at least one centering wing 12, and in this embodiment includes two centering wings 12. The clip assembly 10 also includes two flanges 14, each flange 14 having a snap feature in the form of a clip 16. The clip assembly 10 also includes an opening, generally shown at 18, which is used for receiving an insert 20, which in FIG. 1 is a four-way insert 20.

The clip assembly 10 also includes a body portion 22 having a plurality of support structures 24 which provide structural rigidity to the clip assembly 10.

Each clip 16 is connected to a trim strip, which in this embodiment is a roof ditch molding 26. The roof ditch molding 26 attaches to the roof of a vehicle 28 in the location of a roof ditch 30. The roof ditch 30 is in a location of a seam 32 between the roof of the vehicle 28 and the body side panel 34, as shown in FIGS. 2, 7, 8, and 9.

Figure 2:
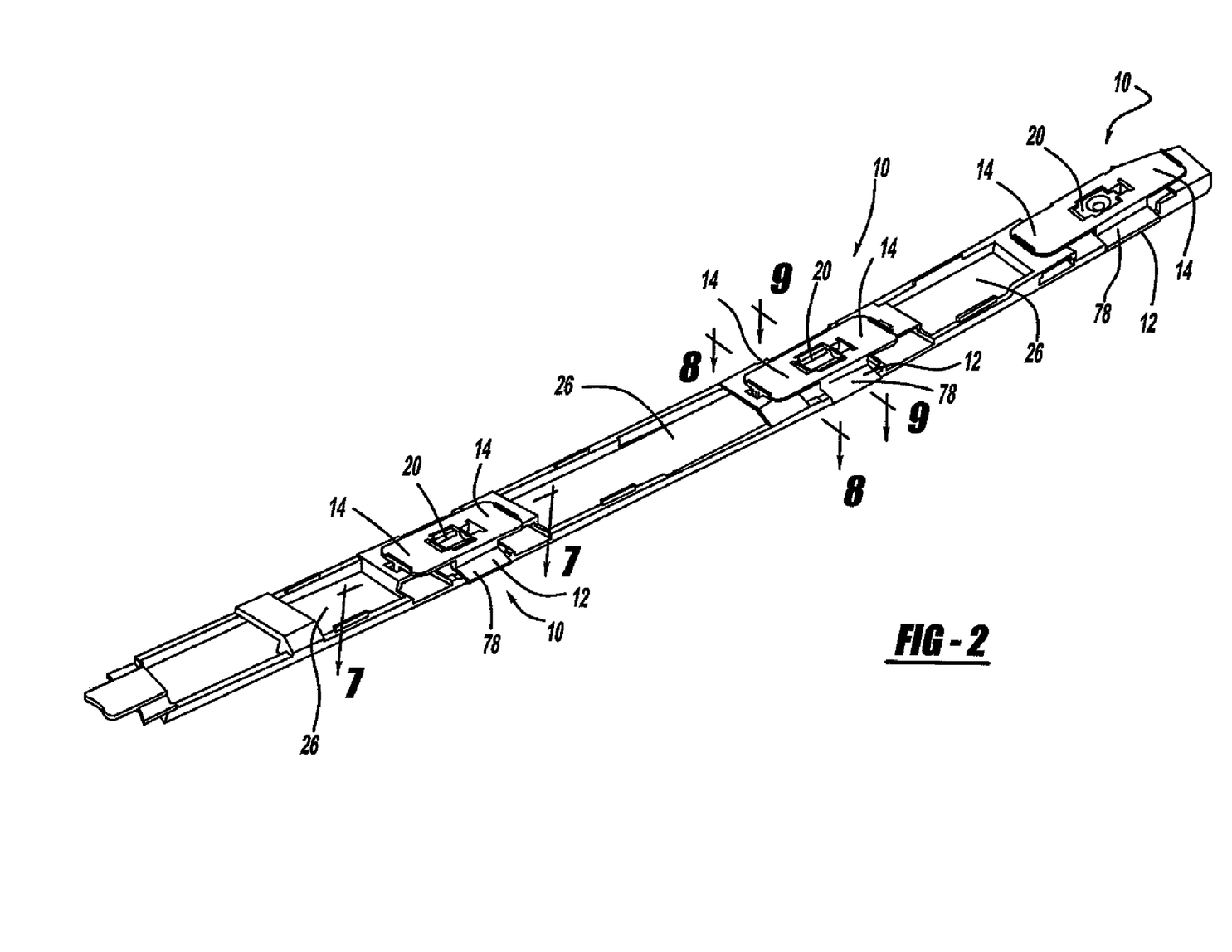
FIG. 2 a perspective view of a roof ditch molding held together by several clip assemblies, according to the present invention.
Figure 3:
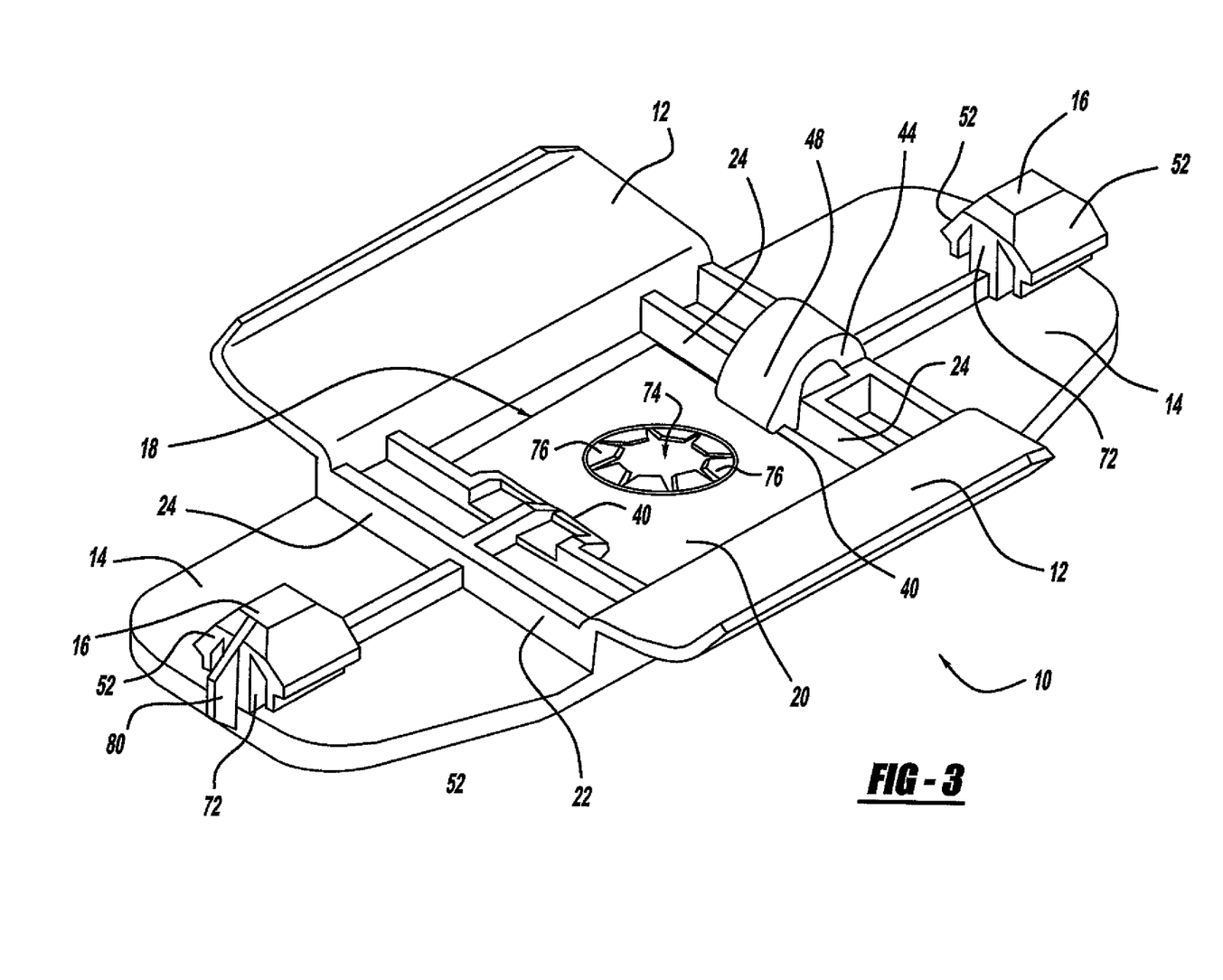
FIG. 3, is a perspective view of a clip assembly having a second type of insert, according to the present invention.
Figure 4:
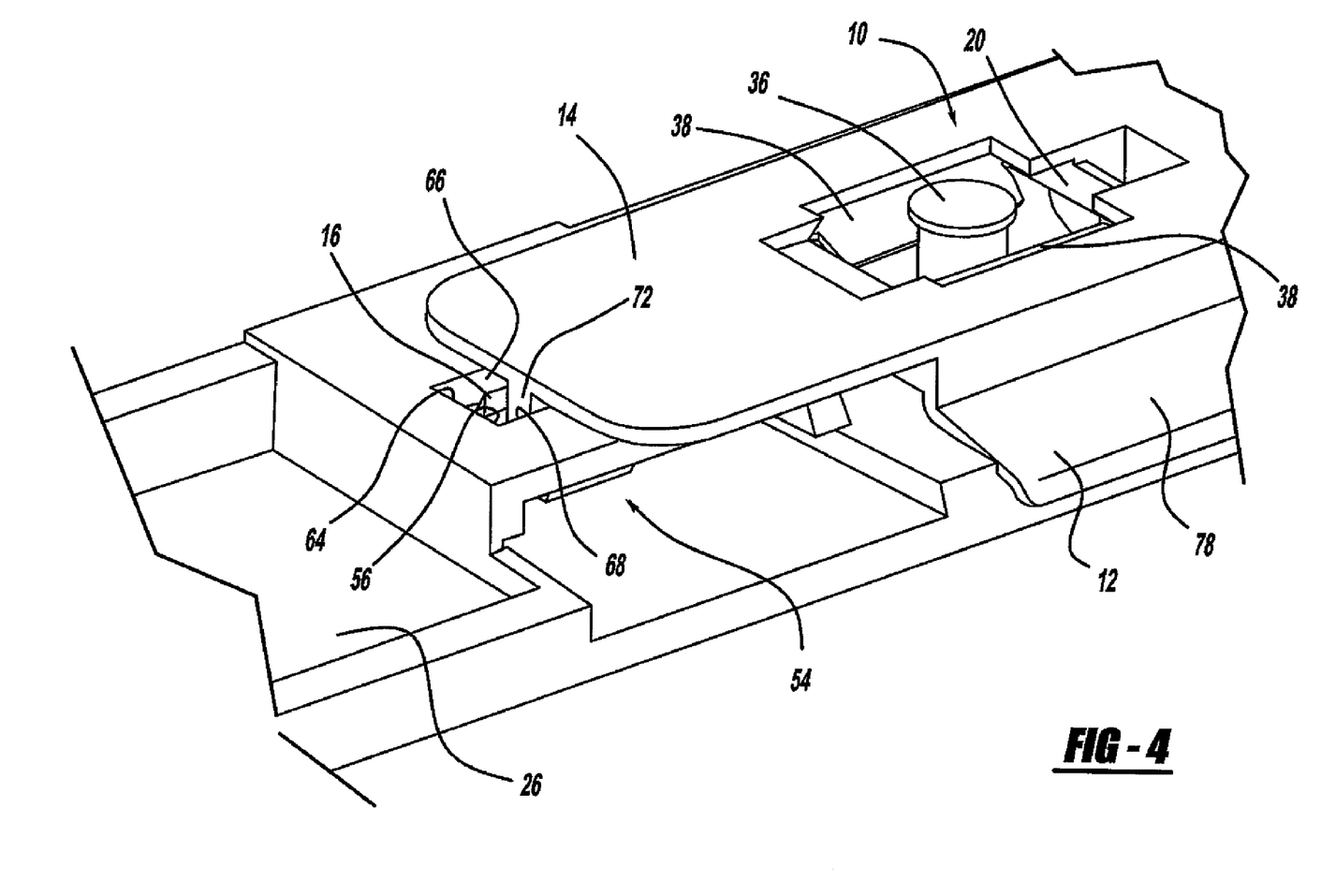
FIG. 4 is, an enlarged perspective view of a roof ditch molding held together by a clip assembly according to the present invention.
Figure 5:
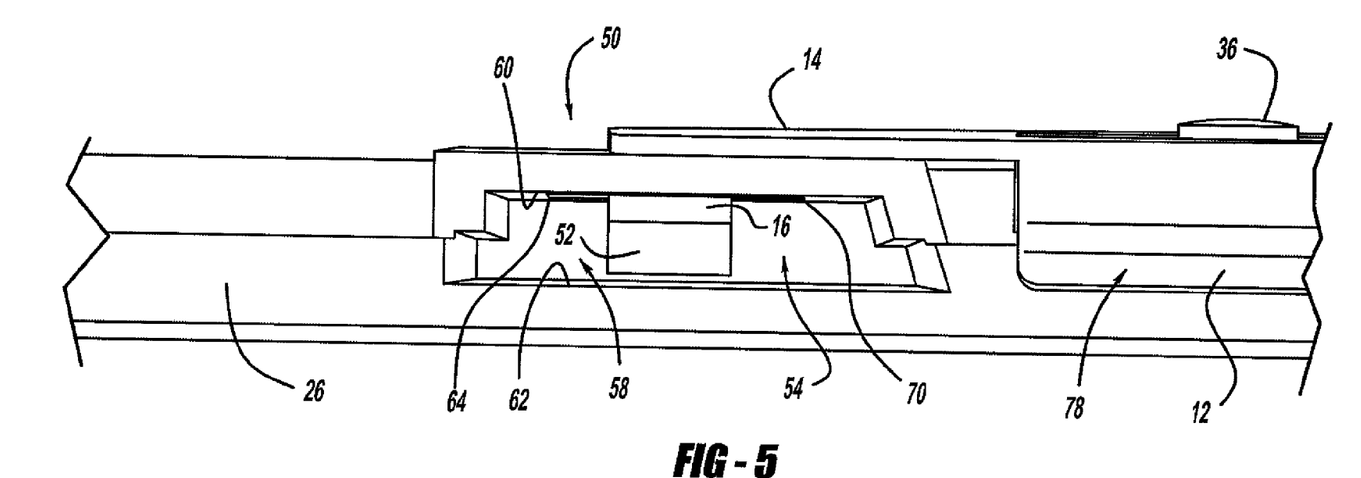
FIG. 5 is a side view of a roof ditch molding and clip assembly, according to the present invention.
Figure 6:
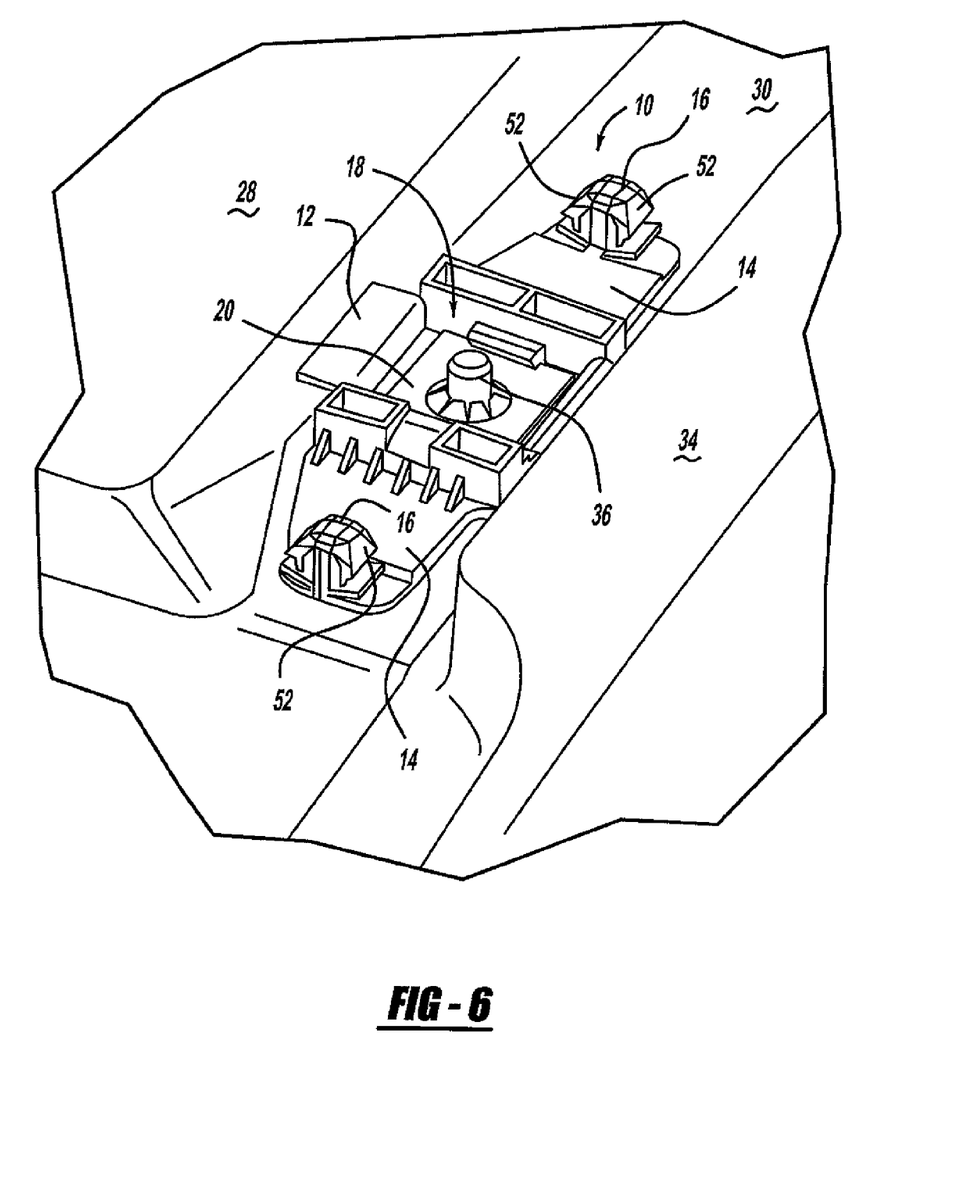
FIG. 6 is a perspective view of a clip assembly attached to the roof ditch of a vehicle, according to the present invention.
Figure 7:
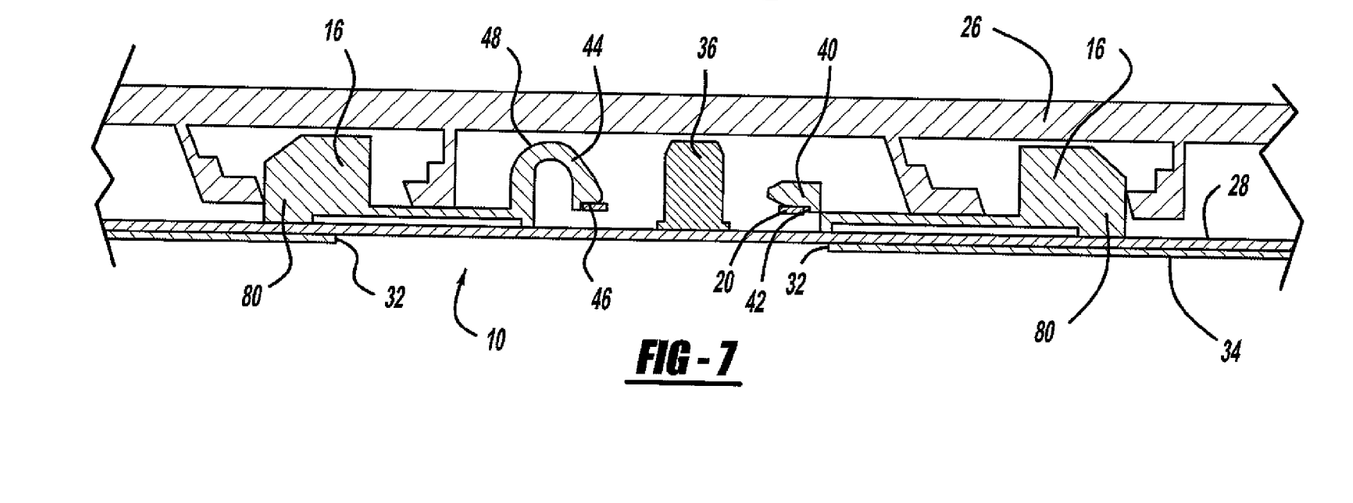
FIG. 7 a sectional view taken along lines 7-7 of FIG. 2, according to the present invention.
Figure 8:
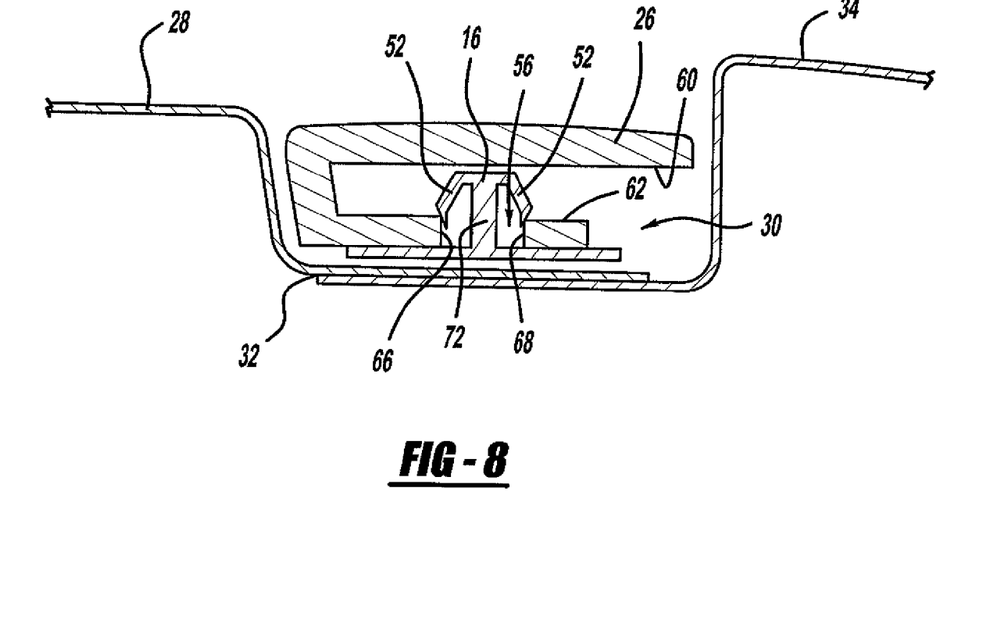
FIG. 8 a sectional view taken along lines 8-8 of FIG. 2, according to the present invention.
Figure 9:
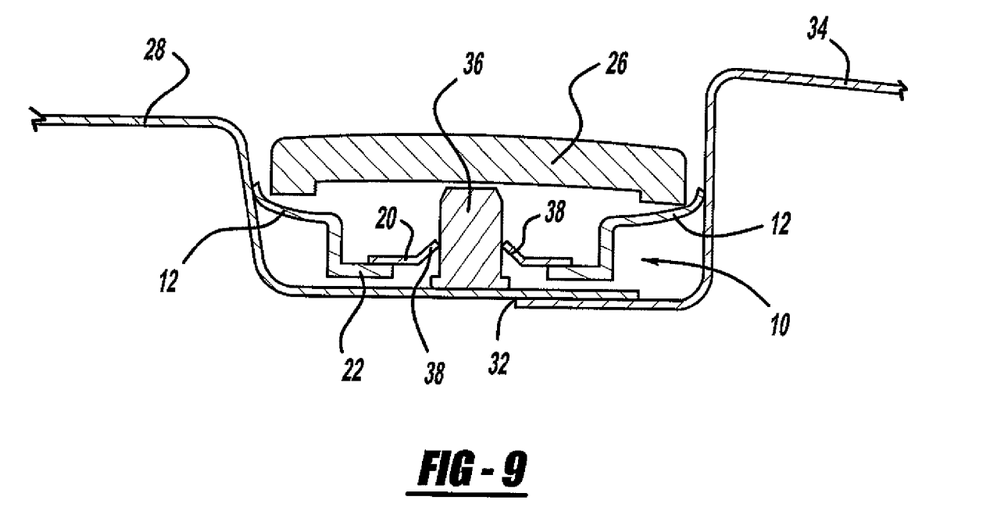
FIG. 9 a sectional view taken along lines 9-9 of FIG. 2, according to the present invention.

Each clip assembly 10 allows for the roof ditch molding 26 to move in the roof ditch 30 of the roof of the vehicle 28. The clip assembly 10 is attached to the roof ditch 30 by a suitable fastener. A stud 36 is received into the insert 20. In this embodiment, the stud 36 forms the fastener of the clip assembly 10. The stud 36 maintains the position of the clip assembly 10 relative to the vehicle, while allowing for compensation in variation of position due to tolerances in assembly. During the manufacturing of a vehicle, the stud 36 is welded along the seam 32, such that the roof ditch molding 26 can be used to cover the roof ditch 30. A second type of insert 20 is shown in FIG. 3. The insert 20 shown in FIG. 3 also receives a stud 36, but does not allow for movement of the clip assembly 10. The second type of insert 20 is located at the end of the roof ditch molding 26 shown in FIG. 2.

It should be noted that the stud 36 and insert 20 could be replaced with other types of fastener components to form a fastener for connecting the clip assembly 10 to the roof ditch 28.

The first type of insert 20, as best seen in FIG. 1, also includes a pair of angled flanges 38 which are in contact with the sides of the stud 36 after assembly. The clip assembly 10 also includes a pair of supports, one is an angled support 40 having a shelf 42, and the other is an arcuate support 44 having a shoulder 46 and an outer arcuate surface 48. During assembly, one end of the inserts 20 is positioned on the shelf 42 of the angled support 40. The opposite end of the insert 20 is then pressed against the arcuate surface 48 such that the arcuate support 44 deflects. This allows the insert 20 to slide along the arcuate surface 48, and onto the shoulder 46. Once the insert 20 is located on the shelf 42 and the shoulder 46, the position of the clip assembly 10 is adjustable in a direction known as "cross-car," and "fore and aft." The term "cross car" means moving in a direction toward or away from one of the vehicle doors, and parallel to the front and rear of the vehicle. The term "fore" means toward the front of the vehicle, and "aft" means toward the rear of the vehicle. When something is moving fore or aft, it is typically moving parallel to the sides of the vehicle.

To connect the clip assembly 10 to the stud 36, the clip assembly 10 is pressed onto the stud 36 such that the stud 36 is received into the insert 20 as shown in FIGS. 2, 4, 6, 7 and 9. As the stud 36 is inserted into the insert 20, the stud 36 is pressed between the angled flanges 38 such that the angled flanges 38 deflect and slide along the outside surface of the stud 36, thereby applying force to the stud 36. Once the stud 36 is received into the insert 20, the stud 36 and clip assembly 10 will be in the position shown in FIGS. 2 and 9.

To connect the clip assembly 10 to the roof ditch molding 26, each of the clips 16 includes at least one angled extension 52 which allows each of the clips 16 to be received into a doghouse or doghouse portion, generally shown at 54. The doghouse 54 is formed as a portion of the roof ditch molding 22, and has an aperture 56 for receiving the clip 16. The doghouse 54 also includes a hollow area, generally shown at 58 having an upper surface 60 and a lower surface 62. There are several doghouses 54 located along the roof ditch molding 26 such that several clip assemblies 10 can be attached to the roof ditch molding 26.

The aperture 56 includes four inside surfaces 64,66,68,70. The width of the aperture 56, formed by inside surfaces 66 and 68, is slightly less than that of the angled extensions 52 of the clip 16. The difference in width causes the angled extensions 52 of the clips 16 to deflect as the clips 16 are inserted into the aperture 56 of the doghouse 54. Once the clips 16 are fully inserted, the angled extensions 52 will no longer be deflected, and will rest against the upper surface 60. The clip assembly 10 will be connected to the roof ditch molding 22 as shown in FIG. 2, with the flange 14 flush against the doghouse 54, and the angled extensions 52 flush with the upper surface 60. Also, a neck portion 72 of the clip 16 extends through the aperture 56, connecting the flange 14 with the angled extensions 52.

Referring to FIG. 3, the second type of insert 20 is shown held in place by the shelf 42 and the shoulder 46. The second type of insert 20 has an aperture 74 surrounded by a series of trapezoidal-shaped flanges 76. The trapezoidal-shaped flanges 76 work in a similar manner to the angled flanges 38, with the exception that the trapezoidal-shaped flanges 76 surround the stud 36, and do not allow the insert 20 to move in relation to the stud 36.

During assembly, each clip assembly 10 is connected to the roof ditch molding 26 first. The roof ditch molding 26 is formed such that a group of clip assemblies 10 can be placed on the roof ditch molding 26 spaced four to six inches apart, with the clip assemblies 10 having the type of insert 20 which include the trapezoidal-shaped flanges 76 being located toward the ends of the roof ditch molding 26. Once the clip assemblies 10 are attached to the roof ditch molding 26, the clip assemblies 10 and the roof ditch molding 26 are attached, as a single unit, to the roof of the vehicle 28 through the use of the clip assemblies 10 and the studs 36. The studs 36 and clip assemblies 10 are connected together, as previously described.

One of the advantages of the present invention is the ability to compensate for tolerance variations, and allow for proper location of the roof ditch molding 26, and clip assemblies 10, in relation to the location of the studs 36. Essentially, the clip assembly 10 allows both lateral and longitudinal movement such that the roof ditch molding 26 can be centered in the roof ditch 30 in both lateral and longitudinal directions.

In this embodiment, the studs 36 are attached to the seam 32 typically through a process such as welding, and have a tolerance variation, which is about one millimeter in any direction relative to the exact location of where the stud 36 is supposed to be. Additionally, the width of the roof ditch 30 can also vary by about one-and-a-half millimeters. As the clip assembly 10 is inserted into the roof ditch 30, the centering wings 12 align the clip assembly 10 such that the clip assembly 10 is centered in the roof ditch 30. The area on the centering wings 12 is also referred to as a "slip area" 78, the slip area 78 is the area used for centering the clip assembly 10 in the roof ditch 30. The inserts 20 having the angled flanges 38 compensate for any variation in the location of the stud 36, because the inserts 20 can float both fore and aft, as well as cross-car.

Additionally, tolerances are also compensated for by use of the clips 16. The clips 16, once inserted through the apertures 56 in the doghouse 54, allow the clip assemblies 10 to move fore an aft in relation to the doghouse 54. The movement allowed by the inserts 20 having the angled flanges 38 combined with the movement allowed by the clips 16 in the doghouses 54, the roof ditch molding 26 can be centered in the roof ditch 28, while allowing for variations in manufacturing.

Another feature of the clip assembly 10 is a rib 80 which is formed as a portion of the clip 16. The rib 80 is used to help center the clip assembly 10 when the clips 16 are inserted through the apertures 56 into the doghouses 54. The ribs 80 slide along one of the inside surfaces 74 of the aperture 56. Because each rib 80 slides along the inside surface 74, both the clips 16 will slide through the apertures 56 in substantially the same location, centering the clip assembly 10 on the roof ditch molding 26 in the fore and aft direction.

The rib 80 also serves an additional purpose of allowing for thermal expansion of the clip assembly 10 and thermal contraction of the roof ditch molding 26. In this embodiment, the rib 80 has a thickness of substantially half-a-millimeter. As the clip assembly 10 expands, the flanges 14 and the clips 16 will press the rib 80 against the inside surface 74, causing the rib 80 to buckle. Additionally, if the roof ditch molding 26 contracts, the inside surface 74 will also press against the rib 80, causing the rib 80 to buckle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clip assembly for positioning a trim strip in a first direction and a second direction, comprising:
   a body portion;
   at least one centering wing connected to said body portion;
   at least one flange connected to said body portion, said at least one flange connectable to a trim strip;
   a fastener connectable to said body portion and a vehicle such that when said fastener is connected to said vehicle and said body portion, said at least one centering wing locates said body portion and said trim strip in said first direction, and said flange connects said body portion to said trim strip;
   at least one clip connected to said at least one flange, wherein said at least one clip connects said at least one flange to said trim strip;
   at least one angled extension formed as a portion of said clip;

a doghouse portion having an aperture, said doghouse portion formed as a portion of said trim strip, said aperture having a plurality of inner surfaces;

an upper surface formed as a portion of said doghouse portion; and a lower surface formed as a portion of said doghouse portion such that when said at least one clip is received into said doghouse portion, said clip is positioned between said upper surface and said lower surface;

wherein said at least one angled extension of said clip deflects as said clip is inserted through said aperture, and after said clip is inserted through said aperture, said at least one angled extension is in contact with said upper surface of said doghouse portion, and said at least one flange is in contact with said doghouse portion.

2. The clip assembly for positioning a trim strip in a first direction and a second direction of claim 1, further comprising at least one rib connected to said at least one flange, wherein said at least one rib contacts one of said plurality of inner surfaces as said clip is inserted through said aperture, and said at least one rib deflects against said doghouse portion as said clip assembly thermally expands.

3. The clip assembly for positioning a trim strip in a first direction and a second direction of claim 2, wherein said at least one rib positions said clip in relation to said trim strip in said second direction as said clip assembly is attached to said trim strip.

4. The clip assembly for positioning a trim strip in a first direction and a second direction of claim 1, further comprising:

an insert;

an opening formed in said body for receiving said insert;

an angled support having a shelf, said angled support formed as a portion of said body in proximity to said opening; and an arcuate support having a shoulder, said arcuate support formed as a portion of said body in proximity to said opening such that when said insert is received in said opening, said insert is supported by said shelf and said shoulder.

5. The clip assembly for positioning a trim strip in a first direction and a second direction of claim 4, said fastener further comprising a stud and said insert further comprising at least one angled flange operably associated with said stud, wherein as said clip assembly is attached to said vehicle, said stud extends through said insert such that said at least one angled flange deflects and slides along said stud such that said at least one angled flange and remains in contact with said stud, attaching said clip assembly to said stud.

6. The clip assembly for positioning a trim strip in a first direction and a second direction of claim 4, said insert further comprising a plurality of trapezoidal flanges operably associated with a stud, wherein as said clip assembly is attached to said vehicle, said stud extends through said insert such that said plurality of angled flanges deflects and slides along said stud such that said plurality of trapezoidal flanges remain in contact with said stud, attaching said clip assembly to said stud.

7. The clip assembly for positioning a trim strip in a first direction and a second direction of claim 1, further comprising a roof ditch formed as a portion of said vehicle, and said trim strip further comprising a roof ditch molding, wherein said clip assembly locates said roof ditch molding in the center of said roof ditch of said vehicle.

8. A clip assembly for connecting a trim strip to a vehicle, comprising:

said trim strip having at least one doghouse portion, and an aperture formed as a portion of said doghouse portion;

a body portion;

at least one centering wing formed as a portion of said body portion;

at least one flange formed as a portion of said body portion;

at least one clip attached to said at least one flange;

at least one rib formed as a portion of said at least one clip such that said at least one clip is inserted through said aperture into said doghouse portion, connecting said at least one flange and said doghouse portion, and as said body portion, said at least one flange, and said at least one clip expand, said at least one rib deflects;

an insert received by said body portion;

at least one angled flange formed as a portion of said insert; and a stud connected to said vehicle such that when said stud is connected to said vehicle, said at least one centering wing provides proper alignment of said trim strip in relation to said vehicle, and said stud is received by said insert, causing said at least one angled flange to deflect and apply a force to said stud, maintaining the position of said insert in relation to said stud.

9. The clip assembly for connecting a trim strip to a vehicle of claim 8, said fastener further comprising:

an insert received by said body portion;

a plurality of trapezoidal-shaped flanges formed as a portion of said insert; and a stud connected to said vehicle such that said stud can be received by said insert, causing said plurality of angled flanges to deflect and apply a force to said stud, maintaining the position of said insert in relation to said stud.

10. The clip assembly for connecting a trim strip to a vehicle of claim 8, further comprising:

at least one angled extension formed as a portion of said clip;

a plurality of inner surfaces forming said aperture; and an upper surface formed as a portion of said doghouse portion, wherein as said clip is inserted through said aperture, said at least one angled extension will deflect until said clip has passed completely through said aperture, and once said at least one angled extension has passed through said aperture, said at least one angled extension will be in contact with said upper surface of said doghouse portion.

11. The clip assembly for connecting a trim strip to a vehicle of claim 8, wherein said at least one rib centers said clip assembly, as said clip is inserted into said doghouse portion.

12. A clip assembly for connecting a roof ditch molding to a vehicle, comprising:

a body portion having an opening;

at least two centering wings formed on opposite sides of said body portion, formed as a portion of said body portion;

at least two flanges formed on opposite sides of said body portion, formed as a portion of said body portion, said at least one flange connectable to a roof ditch molding;

at least one clip formed as a portion of said at least one flange, said at least one clip is received by an aperture formed in said roof ditch molding; and an insert disposed within said opening for connecting said body portion to a stud located in a roof ditch of said vehicle;

an angled support having a shelf formed as a portion of said body portion; and an arcuate support having a shoulder, said arcuate support formed as a portion of said body portion, and when said insert connects said body portion to said vehicle and said roof ditch molding is connected to said at least one flange, said at least one centering wing positions said body portion in the center of said roof ditch.

13. The clip assembly for connecting a roof ditch molding to a vehicle of claim 12, further comprising:
a doghouse portion formed as a portion of said roof ditch molding, said aperture further comprising a plurality of inner surfaces which allow said clip to be inserted into said doghouse portion;
at least one angled extension formed as a portion of said at least one clip;
an upper surface formed as a portion of said doghouse portion; and
a lower surface formed as a portion of said doghouse portion such that said at least one angled extension deflects as said clip is inserted through said aperture, and after said at least one clip is inserted into said aperture, said at least one angled extension will be in contact with said upper surface of said doghouse portion, and said at least one clip will be inserted into said doghouse portion.

14. The clip assembly for connecting a roof ditch molding to a vehicle of claim 13, further comprising a rib formed on said at least one clip, and said rib is in sliding contact with one of said plurality of inner surfaces as said at least one clip is inserted through said aperture, positioning said clip relative to said roof ditch molding.

15. The clip assembly for connecting a roof ditch molding to a vehicle of claim 14, wherein said at least one rib deflects as said clip assembly thermally expands, or said roof ditch molding thermally contracts.

16. The clip assembly for connecting a roof ditch molding to a vehicle of claim 12, said insert further comprising;
at least one angled flange operably associated with said stud, wherein said stud is received into said insert such that said at least one angled flange deflects, applying a force to said stud to maintain the position of said clip assembly in relation to said roof ditch, and said insert allows said at least one angled flange to position said clip assembly in the center of said roof ditch.

17. The clip assembly for connecting a roof ditch molding to a vehicle of claim 12, said insert further comprising:
a plurality of trapezoidal-shaped flanges operably associated with said stud such that said stud is inserted through said insert and said plurality of trapezoidal-shaped flanges and said plurality of trapezoidal-shaped flanges deflect, surround, and support said stud such that said plurality of trapezoidal-shaped flanges apply a force to said stud, holding said stud in said insert.

18. A clip assembly for positioning a trim strip in a first direction and a second direction, comprising:
a body portion;
at least one centering wing connected to said body portion;
at least one flange connected to said body portion, said at least one flange connectable to a trim strip;
an insert;
an opening formed in said body for receiving said insert;
an angled support having a shelf, said angled support formed as a portion of said body in proximity to said opening;

an arcuate support having a shoulder, said arcuate support formed as a portion of said body in proximity to said opening such that when said insert is received in said opening, said insert is supported by said shelf and said shoulder; and
a fastener connectable to a vehicle and said insert such that when said fastener is connected to said vehicle and said insert, said at least one centering wing locates said body portion and said trim strip in said first direction, and said flange connects said body portion to said trim strip.

19. The clip assembly for positioning a trim strip in a first direction and a second direction of claim 18, further comprising at least one clip connected to said at least one flange, wherein said at least one clip connects said at least one flange to said trim strip.

20. The clip assembly for positioning a trim strip in a first direction and a second direction of claim 19, further comprising:
at least one angled extension formed as a portion of said clip;
a doghouse portion having an aperture, said doghouse portion formed as a portion of said trim strip, said aperture having a plurality of inner surfaces;
an upper surface formed as a portion of said doghouse portion; and
a lower surface formed as a portion of said doghouse portion such that when said at least one clip is received into said doghouse portion, said clip is positioned between said upper surface and said lower surface.

21. The clip assembly for positioning a trim strip in a first direction and a second direction of claim 20, wherein said at least one angled extension of said clip deflects as said clip is inserted through said aperture, and after said clip is inserted through said aperture, said at least one angled extension will be in contact with said upper surface of said doghouse portion, and said at least one flange will be in contact with said doghouse portion.

22. The clip assembly for positioning a trim strip in a first direction and a second direction of claim 20, further comprising at least one rib connected to said at least one flange, wherein said at least one rib contacts one of said plurality of inner surfaces as said clip is inserted through said aperture, and said at least one rib deflects against said doghouse portion as said clip assembly thermally expands.

23. The clip assembly for positioning a trim strip in a first direction and a second direction of claim 22, wherein said at least one rib positions said clip in relation to said trim strip in said second direction as said clip assembly is attached to said trim strip.

24. The clip assembly for positioning a trim strip in a first direction and a second direction of claim 18, said fastener further comprising a stud and said insert further comprising at least one angled flange operably associated with said stud, wherein as said clip assembly is attached to said vehicle, said stud extends through said insert such that said at least one angled flange deflects and slides along said stud such that said at least one angled flange and remains in contact with said stud, attaching said clip assembly to said stud.

25. The clip assembly for positioning a trim strip in a first direction and a second direction of claim 18, further comprising a roof ditch formed as a portion of said vehicle, and said trim strip further comprising a roof ditch molding, wherein said clip assembly locates said roof ditch molding in the center of said roof ditch of said vehicle.

* * * * *

UNITED STATES PATENT AND TRADEMARK OFFICE
CERTIFICATE OF CORRECTION

PATENT NO. : 7,837,257 B2
APPLICATION NO. : 12/105531
DATED : November 23, 2010
INVENTOR(S) : Christopher J. Kuntze et al.

Page 1 of 1

It is certified that error appears in the above-identified patent and that said Letters Patent is hereby corrected as shown below:

Column 2, Line 54, "roof ditch 28" should be -- roof ditch 30 --.

Column 3, Line 22, "roof ditch molding 22" should be -- roof ditch molding 26 --.

Column 3, Line 36, "roof ditch molding 22" should be -- roof ditch molding 26 --.

Column 4, Line 25, "roof ditch 28" should be -- roof ditch 30 --.

Signed and Sealed this
Ninth Day of April, 2013

Teresa Stanek Rea
*Acting Director of the United States Patent and Trademark Office*